(No Model.)
J. H. CLOYES.
SPRING SEAT.
No. 604,368. Patented May 24, 1898.
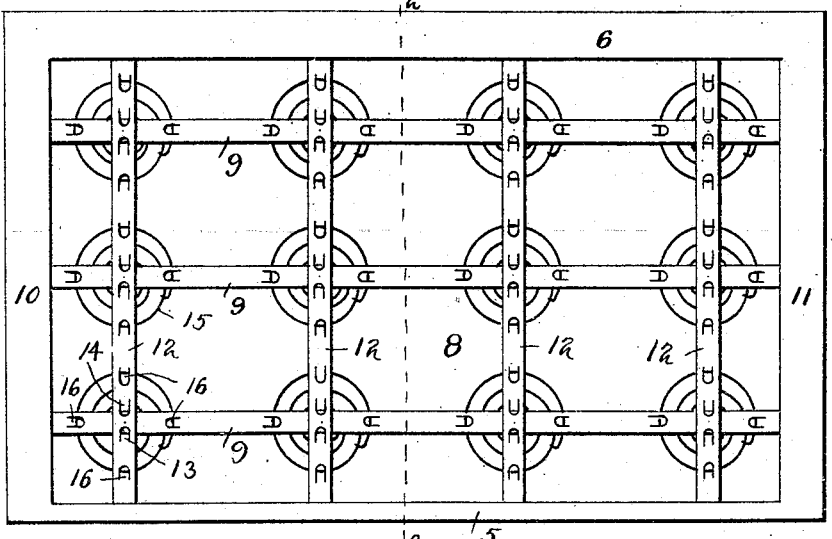
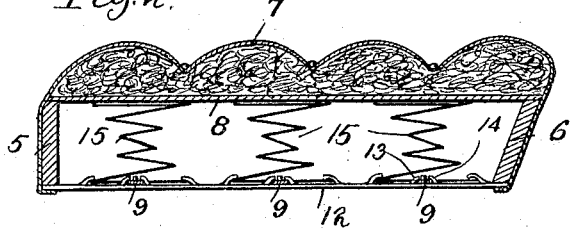
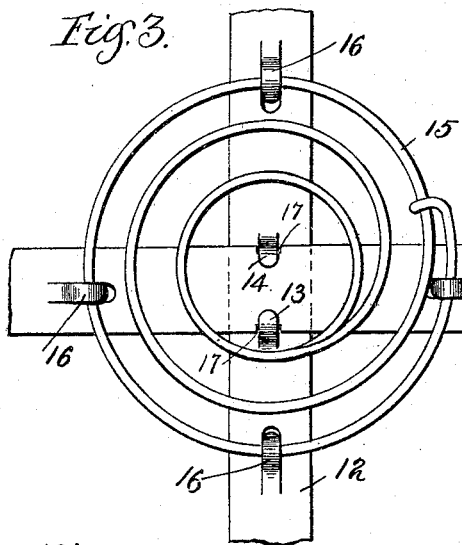
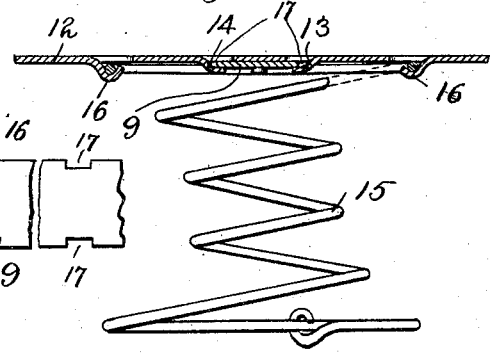
Witnesses.
Wm. W. Rheem.
Holmes A. Bilden.
Inventor.
James H. Cloyes
by Bond, Adams, Pickard & Jackson
atty's

UNITED STATES PATENT OFFICE.

JAMES H. CLOYES, OF CHICAGO, ILLINOIS, ASSIGNOR TO THE STAVER CARRIAGE COMPANY, OF SAME PLACE.

SPRING-SEAT.

SPECIFICATION forming part of Letters Patent No. 604,368, dated May 24, 1898.

Application filed December 27, 1897. Serial No. 663,443. (No model.)

*To all whom it may concern:*

Be it known that I, JAMES H. CLOYES, a citizen of the United States, residing in Chicago, in the county of Cook and State of Illinois, have invented certain new and useful Improvements in Spring-Seats, whereof the following is a specification.

My invention relates to spring-seats, and has for its object to provide an improved spring-seat which will be particularly adapted for cushions for buggies and similar purposes, and which will be efficient, durable, and cheap in construction.

That which I regard as new will be set forth in the claims.

In the drawings, Figure 1 is a bottom view of a buggy-cushion embodying my invention. Fig. 2 is a cross-section on line 2 2 of Fig. 1. Fig. 3 is a view illustrating the arrangement of the cross-strips and springs. Fig. 4 is a vertical section of the parts shown in Fig. 3.

It will be understood that while I have shown my improvements as applied to a buggy-cushion they may be used in the construction of spring-seats and cushions of many other forms.

Referring to the accompanying drawings, 5 6 indicate, respectively, the front and back portions of a buggy-seat, and 7 the upholstered top thereof, which rests upon a supporting-frame 8, as shown in Fig. 2.

9 indicates a series of longitudinal strips the ends of which are connected to the end pieces 10 11 of the seat. 12 indicates a series of cross-strips the ends of which are connected to the front and back pieces 5 6 of the seat, as shown.

As shown in Fig. 3, the longitudinal and transverse strips 9 12 are connected at their points of intersection by tongues 13 14, which are struck up from one of the strips, as 12, and overlap the other strip. In assembling the parts one of the tongues is bent back sufficiently to permit the parts to properly come together, after which it is bent down closely upon the strip. To prevent displacement of the strips, notches 17 are provided to receive the tongues 13 14, as best shown in Fig. 4, said notches being formed in the edges of the underlying strips opposite the tongues, as shown in Figs. 3 and 4. By this construction longitudinal movement of the strips is effectually prevented.

15 indicates springs, which are preferably double conical springs, as shown in the drawings. The upper ends of the springs rest against the frame 8, as shown in Fig. 2, and their lower ends rest upon the strips 9 12, over their points of intersection, as shown in Figs. 1 and 3. Tongues 16, which are struck up from the different strips 9 12, overlap the springs and hold them properly in place, as shown in Figs. 3 and 4.

By this construction I am enabled to provide a spring-seat which may be very cheaply made, inasmuch as the tongues may be readily formed by stamping or other suitable means, and the construction described makes the work of assembling the different parts simple and permits of its being quickly done.

That which I claim as my invention, and desire to secure by Letters Patent, is—

1. In a spring-seat, the combination with longitudinal and transverse strips, of tongues projecting from one of said strips and overlapping the other to hold said strips together, and springs supported by said strips, substantially as described.

2. In a spring-seat, the combination with longitudinal and transverse strips, of tongues projecting from one of said strips and overlapping the other to hold said strips together, springs supported by said strips, and tongues projecting from said strips and overlapping said springs to retain them in position, substantially as described.

3. In a spring-seat, the combination with longitudinal and transverse strips, of tongues projecting from one of said strips and overlapping the other to hold said strips together, notches in the overlapped strips, which receive said tongues, and springs supported by said strips, substantially as described.

JAMES H. CLOYES.

Witnesses:
JOHN L. JACKSON,
ALBERT H. ADAMS.